Patented Apr. 21, 1931

1,802,154

UNITED STATES PATENT OFFICE

WILHELM MICHAEL, OF OPPAU, AND WALTHER HAAG, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF α-HYDROXYCARBOXYLIC ACIDS

No Drawing. Application filed August 17, 1928, Serial No. 300,379, and in Germany August 24, 1927.

If it is desired to prepare alpha-hydroxycarboxylic acids from their nitriles, by saponification with undiluted mineral acids, either extensive formation of anhydrides of the resulting hydroxycarboxylic acids, or even carbonization, occurs, according to the nature of the saponifying acid. If the saponification be effected with dilute acids, it is true that this drawback is obviated, but the hydroxycarboxylic acids are obtained in a state of aqueous solution in which the ammonium salts formed during the reaction are wholly or partially dissolved, so that the isolation of the hydroxycarboxylic acids from the aqueous solution is often difficult and frequently causes losses. It has therefore been proposed to extract the hydroxycarboxylic acids with solvents which are not miscible with water, a procedure, however, which is cumbrous, protracted and leading to only incomplete results.

We have now found that all the difficulties above referred to are avoided and that a very good yield of alpha-hydroxycarboxylic acids is easily obtained from their nitriles, by effecting the saponification of the nitriles with acids, preferably gaseous hydrochloric acid, in the presence of an inert solvent which consists of or contains a substantial proportion of dioxane and is capable of dissolving the reagent substances, and the reaction products, except the resulting ammonium salt, a sufficient amount of water for the saponification being added, whereupon after the removal of the precipitated ammonium salt, the solvent is eliminated preferably by distillation with or without the aid of a vacuum. Solvents, which have been found particularly suitable for this purpose, include dioxane and mixtures thereof with, ethyl ether, tetrachlorethane, chloroform and other inert solvents or mixtures of the same which are unaffected by the saponifying acid.

The alpha-hydroxycarboxylic acids may also be prepared by forming the nitriles themselves, in dioxane or mixtures containing the same afterwards employed in the saponification stage, by the condensation of aldehydes or ketones with hydrocyanic acid. The addition of the amount of water required for the ensuing saponification may be effected before or after the nitrile synthesis. The advantage of this procedure is that the isolation of the nitrile is rendered superfluous, and moreover, the aforesaid inert solvent exercises a moderating influence on the frequently turbulent course of the condensation.

The ammonium salt of the saponifying acid formed during the saponification separates out and may be removed, for example by filtration. The residual mixture of alpha-hydroxycarboxylic acid and solvent is preferably separated into its components by distillation in vacuo. In many instances the mere distilling off of the used solvent suffices to furnish the alpha-hydroxycarboxylic acids in an anhydrous and extremely pure condition, since the said solvents practically preclude any formation of anhydrides, such as otherwise readily occurs and greatly hampers the separation.

The following examples will further illustrate the nature of the said invention which however is not limited thereto.

Example 1

150 litres of dioxane are mixed, in a cooled reaction vessel, with 10 litres of $n/2$ caustic soda solution, 20 litres of water and 39 litres of anhydrous hydrocyanic acid. A reflux condenser, maintained at a temperature below 0° C. is then attached, and 67 litres of 90 per cent acetaldehyde are slowly run in. The nitrile of lactic acid is formed, and the temperature of the reaction mixture rises to about 80° C. After the reaction has ceased, gaseous hydrochloric acid is introduced. When the saponification into lactic acid is complete, which can readily be ascertained by boiling a sample with hydrochloric acid, the mixture is cooled and separated from the deposited ammonium chlorid by filtration. Any coloration observed may be easily removed by boiling with animal charcoal or the like. When distilling off the dioxane, if desired in vacuo, concentrated lactic acid is obtained. If necessary the acid is again treated with dioxane, in order to eliminate the final trace of ammonium chlorid and is again filtered, and distilled in order to expel the solvent. 76 kilograms of pure lactic acid corresponding to 84 per cent of the theoretical yield, with reference to hydrocyanic acid, are obtained, the yield obtainable with the aid of chloroform instead of dioxane being 60 per cent only of the theoretical yield.

*Example 2*

50 litres of dioxane, 5 litres of a 5 per cent caustic potash solution and 39 litres of anhydrous hydrocyanic acid are mixed in a cooled reaction vessel, whereupon a reflux condenser, maintained at a temperature below 0° C., is attached and a mixture of 106 kilograms of benzaldehyde and 50 kilograms each of tetrachlorethylene and dioxane is slowly introduced. The temperature of the reaction mixture rises and the nitrile of mandelic acid is formed. When the reaction has terminated, gaseous hydrochloric acid is passed in, and 31 litres of water are dropped in at the same time. The completion of the saponification can be ascertained in the same manner as in Example 1. The still warm reaction product is filtered off from the deposited ammonium chlorid and the greater portion of the mandelic acid crystallizes out on cooling, the remainder being recovered by evaporating the solvent. The yield obtained is almost theoretical.

What we claim is:—

1. A process of producing alpha-hydroxy-carboxylic acids, which comprises saponifying the corresponding nitriles with an acid and so much water as is sufficient for saponification in an organic inert solvent containing a substantial proportion of dioxane and being capable of dissolving the reagent substances and the reaction products, but not the ammonium salt formed, removing the latter and separating the alpha-hydroxycarboxylic acid from the solvent.

2. A process of producing alpha-hydroxy-carboxylic acids which comprises saponifying the corresponding nitriles with gaseous hydrochloric acid and so much water as is sufficient for saponification in an organic inert solvent containing a substantial proportion of dioxane and being capable of dissolving the reagent substances and the reaction products, but not the ammonium chlorid formed, removing the latter and separating the alpha-hydroxycarboxylic acid from the solvent by fractional distillation.

3. A process of producing alpha-hydroxy-carboxylic acids which comprises saponifying the corresponding nitriles with gaseous hydrochloric acid and so much water as is sufficient for saponification, in dioxane, removing the ammonium chlorid formed from the solution and separating the alpha-hydroxycarboxylic acid from the dioxane by fractional distillation.

4. A process of producing alpha-hydroxy-carboxylic acid which comprises bringing an organic carbonyl compound to reaction with hydrocyanic acid and saponifying the nitrile obtained with an acid and the amount of water required for saponification, both reactions being carried out in an organic inert solvent containing a substantial proportion of dioxane and being capable of dissolving the reagent substances and the reaction products, but not the ammonium salt formed, removing the latter and separating the alpha-hydroxycarboxylic acid from the solvent.

5. A process of producing alpha-hydroxy-carboxylic acid which comprises bringing an organic carbonyl compound to reaction with hydrocyanic acid and saponifying the nitrile obtained with an acid and the amount of water required for saponification both reactions being carried out in dioxane removing the ammonium salt formed and separating the alpha-hydroxycarboxylic acid from the dioxane by fractional distillation.

6. A process of producing lactic acid which comprises bringing acetaldehyde to reaction with hydrocyanic acid dissolved in dioxane to which is added a small amount of caustic soda dissolved in so much water as is sufficient for saponifying the nitrile of lactic acid formed, introducing gaseous hydrochloric acid, separating the ammonium chlorid formed, and distilling off the dioxane.

In testimony whereof we have hereunto set our hands.

WILHELM MICHAEL.
WALTHER HAAG.